United States Patent
Hebbar et al.

(10) Patent No.: US 10,353,985 B2
(45) Date of Patent: Jul. 16, 2019

(54) TRANSFERRING COMPONENT HIERARCHIES BETWEEN APPLICATIONS

(71) Applicant: Adobe Inc., San Jose, CA (US)

(72) Inventors: Vivek Hebbar, Cupertino, CA (US); Randy L. Swineford, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 908 days.

(21) Appl. No.: 14/513,772

(22) Filed: Oct. 14, 2014

(65) Prior Publication Data

US 2015/0033118 A1    Jan. 29, 2015

Related U.S. Application Data

(63) Continuation of application No. 12/409,310, filed on Mar. 23, 2009, now Pat. No. 9,015,611.

(51) Int. Cl.
*G06F 3/0486* (2013.01)
*G06F 3/0481* (2013.01)
(Continued)

(52) U.S. Cl.
CPC ............ *G06F 17/211* (2013.01); *G06F 3/048* (2013.01); *G06F 3/04842* (2013.01);
(Continued)

(58) Field of Classification Search
CPC .... G06F 3/0486; G06F 3/0481; G06F 9/4443; G06F 17/24; G06F 9/543
See application file for complete search history.

(56) References Cited

U.S. PATENT DOCUMENTS

| | | | |
|---|---|---|---|
| 5,911,145 A | | 6/1999 | Arora et al. |
| 6,038,567 A | * | 3/2000 | Young ................... G06F 17/211 |

(Continued)

OTHER PUBLICATIONS 3d-canvas.com, "Tutorials—Using the Scene Hierarchy," [online]. Retrieved from the Internet: http://www.3d-canvas.com/3DCanvasDocumentation/tutorialscenehierarchy.htm, retrieved on Mar. 9, 2009, 6 pages.

(Continued)

*Primary Examiner* — Doon Y Chow
*Assistant Examiner* — Le V Nguyen
(74) *Attorney, Agent, or Firm* — Finch & Maloney PLLC

(57) ABSTRACT

Methods, systems, and apparatus, including computer program products, for reusing components from an application are provided. In some implementations, a method includes associating a parent and child component in a source application. The components are used in the presentation of document data during navigation among documents. A navigation interface in an application window of the source application is presented, including presenting document data according to the parent and child components. Input adding the parent component from the source application window to an application window of a target application is received. It is determined that the output of the child component is connected with the input of the parent component, and then computer readable instructions associated with the parent component and the child component are inserted into the target application. A navigation interface is presented in the target application window, including presenting document data according to the parent and child components.

18 Claims, 9 Drawing Sheets

(51) Int. Cl.
*G06F 17/24* (2006.01)
*G06F 3/048* (2013.01)
*G06F 17/21* (2006.01)
*G06F 3/0484* (2013.01)
*G06F 9/451* (2018.01)
*G06F 3/01* (2006.01)
*G06F 9/06* (2006.01)

(52) U.S. Cl.
CPC .............. *G06F 9/451* (2018.02); *G06F 17/24* (2013.01); *G06F 3/01* (2013.01); *G06F 9/06* (2013.01)

(56) References Cited

U.S. PATENT DOCUMENTS

| | | | |
|---|---|---|---|
| 6,668,354 | B1 | 12/2003 | Chen et al. |
| 7,178,129 | B2 | 2/2007 | Katz |
| 7,246,307 | B2 | 7/2007 | Arora et al. |
| 7,434,170 | B2 | 10/2008 | Novak et al. |
| 8,732,581 | B2 | 5/2014 | Poling et al. |
| 2003/0172196 | A1* | 9/2003 | Hejlsberg ............. G06F 9/4488 719/328 |
| 2004/0172616 | A1 | 9/2004 | Rothschiller et al. |
| 2004/0255269 | A1 | 12/2004 | Santori et al. |
| 2006/0048048 | A1 | 3/2006 | Welcker et al. |
| 2007/0112679 | A1* | 5/2007 | Kwon ..................... G06F 21/10 705/51 |
| 2007/0162842 | A1* | 7/2007 | Ambachtsheer .... G06F 17/2247 715/205 |
| 2007/0250783 | A1 | 10/2007 | Wu et al. |
| 2008/0028333 | A1 | 1/2008 | Perelman et al. |
| 2008/0155518 | A1 | 6/2008 | van Wyk et al. |
| 2009/0019370 | A1 | 1/2009 | Pally |
| 2009/0089656 | A1 | 4/2009 | McAfee et al. |
| 2009/0112913 | A1* | 4/2009 | Murthy ............. G06F 17/30312 |
| 2009/0292980 | A1 | 11/2009 | Swineford et al. |
| 2011/0035692 | A1* | 2/2011 | Sandone .............. G11B 27/034 715/769 |
| 2014/0032482 | A1 | 1/2014 | Dulaney et al. |
| 2014/0033017 | A1 | 1/2014 | McAfee et al. |
| 2014/0033046 | A1 | 1/2014 | Walsh et al. |

OTHER PUBLICATIONS

CodeIdol, "Drag-and-Drop Data Binding," © 2009 [online]. Retrieved from the Internet: http://codeidol.com/csharp/windows-forms-programming/Applied-Data-Bnding/Drag-and-Drop-Data-Binding/, 8 pages.

MSDN Blogs, "Drag-Drop Data Binding for WPE (by Milind Lele)," Nov. 7, 2008 [online]. Retrieved from the Internet: http://blogs.msdn.com/b/vsdata/archive/2008/11/08/drag-drop-data-binding-for-wpf-by-milind-lele.aspx, 4 pages.

Tech Crunch, "MySpace Tests Profile 2.0 With Drag and Drop Interface," by Michael Arrington, Oct. 26, 2008 [online]. Retrieved from the Internet: http://techcrunch.com/2008/10/26/myspace-launches-profile-20-with-drag-and-drop-interface/, 3 pages.

\* cited by examiner

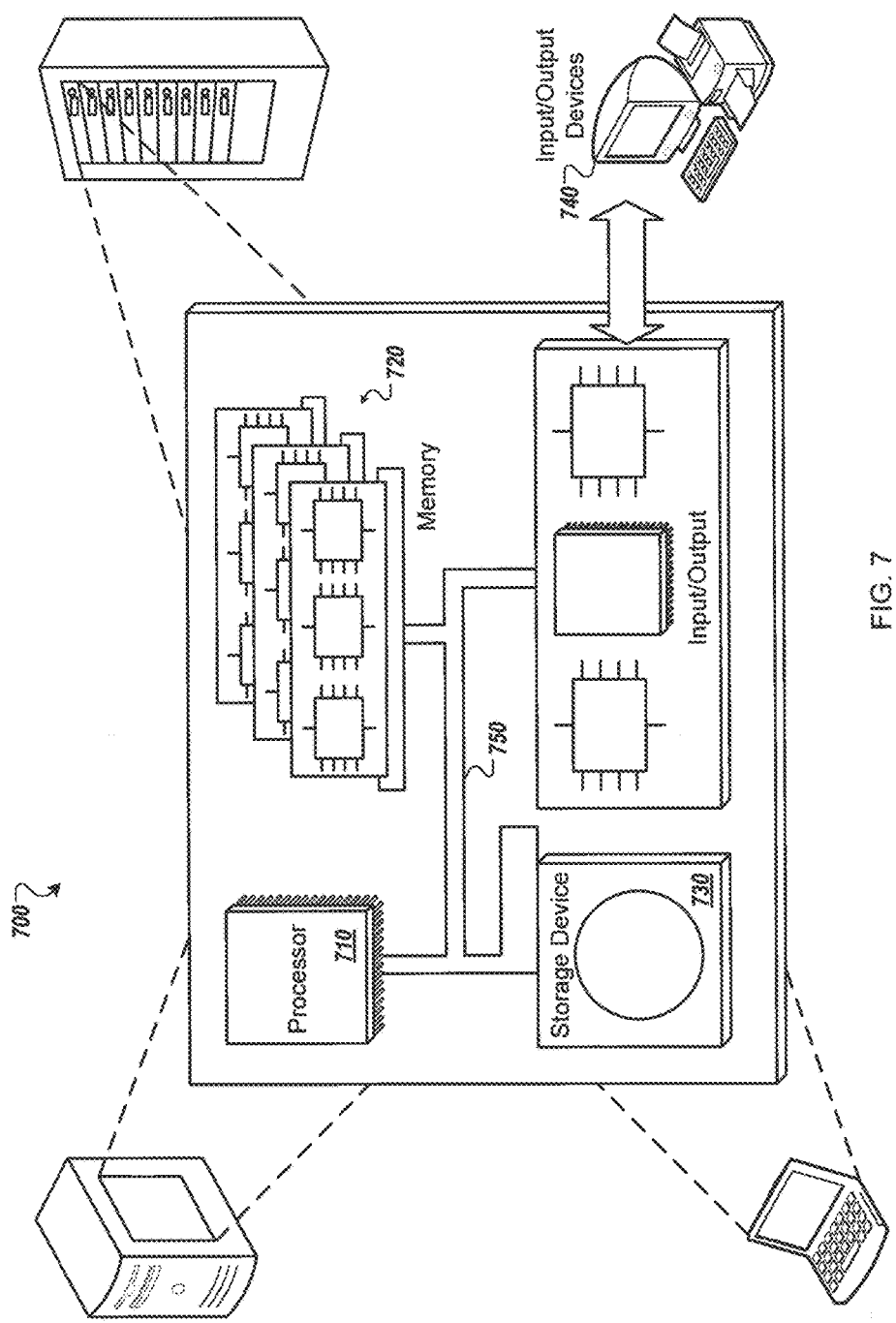

TRANSFERRING COMPONENT HIERARCHIES BETWEEN APPLICATIONS

CROSS-REFERENCE TO RELATED APPLICATIONS

This application is a continuation of U.S. patent application Ser. No. 12/409,310 (filed 23 Mar. 2009), which is hereby incorporated by reference herein.

BACKGROUND

This specification relates to inserting components into applications.

Programmers often develop software applications as a series of components that perform specific functions. The components interact with each other to provide desired functionality. To obtain desired functionality, all necessary components are incorporated into a software program. Frequently, the functions performed by individual components are unknown to a user. Thus, to obtain desired functionality, a user must use a trial and error approach of selecting and combining components until the desired functionality is obtained.

SUMMARY

This specification describes technologies relating to reusing one or more components from an application. In general, one aspect of the subject matter described in this specification can be embodied in a method that includes the acts of associating a parent component and a child component in an executing source application. An output of the child component is connected with an input of the parent component. The parent and child components are used in the presentation of document data during navigation among documents. A first navigation user interface is presented in a source application window of the source application, including presenting source document data associated with source documents according to the parent and child components. Input is received adding the parent component from the source application window to a target application window of an executing target application. In response to the input, it is determined that the output of the child component is connected with the input of the parent component, and then one or more computer readable instructions associated with the parent component and one or more computer readable instructions associated with the child component are inserted into the target application. A second navigation user interface is presented in the target application window, including presenting target document data associated with the target document according to the parent and child components. Other implementations include corresponding systems, apparatus, computer program products, and computer storage media.

These and other implementations can optionally include one or more of the following features. The received input can comprise a drag-and-drop operation.

Associating the parent and child components can further comprise associating a grandchild component with the child component in the executing source application, where an output of the grandchild component is connected with an input of the child component and where the parent and child and grandchild components are used in the presentation of document data during navigation among documents. In response to the input, it can be determined that the output of the grandchild component is connected with the input of the child component, and then one or more computer-readable instructions associated with the grandchild component can be inserted into the target application. Presenting the second navigation interface can include presenting target document data associated with the target documents according to the parent component, child component, and grandchild component.

An input of the child component can be determined to not be connected to an output of a component in the target application. A first component in the target application that has an output of a same type as the input of the child component and that is not connected to an input of a component in the target application can be identified. The child component and the first component can be associated in the target application and the input of the child component can be connected with the output of the first component. An output of the parent component can be determined to not be connected to an input of a component in the target application. A second component in the target application that has an input of a same type as the output of the parent component and that is not connected to an output of a component in the target application can be identified. The parent component can be associated with the second component in the target application, and the output of the parent component can be connected with the input of the second component.

A virtual machine associated with the target application can be caused to execute the computer readable instructions.

Particular embodiments of the subject matter described in this specification can be implemented so as to realize one or more of the following advantages. A user can easily change how document data is presented during navigation of documents by dragging a component from one application to another. A user can move a component and its sub-components between applications without understanding the relationships between the component and the sub-components. A component's subcomponents can be automatically moved with the component. Presentation of document data according to a complete component hierarchy can be maintained across applications.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 7 is a schematic diagram of an example of a generic computer system.

Like reference numbers and designations in the various drawings indicate like elements.

DETAILED DESCRIPTION

Figure 1:
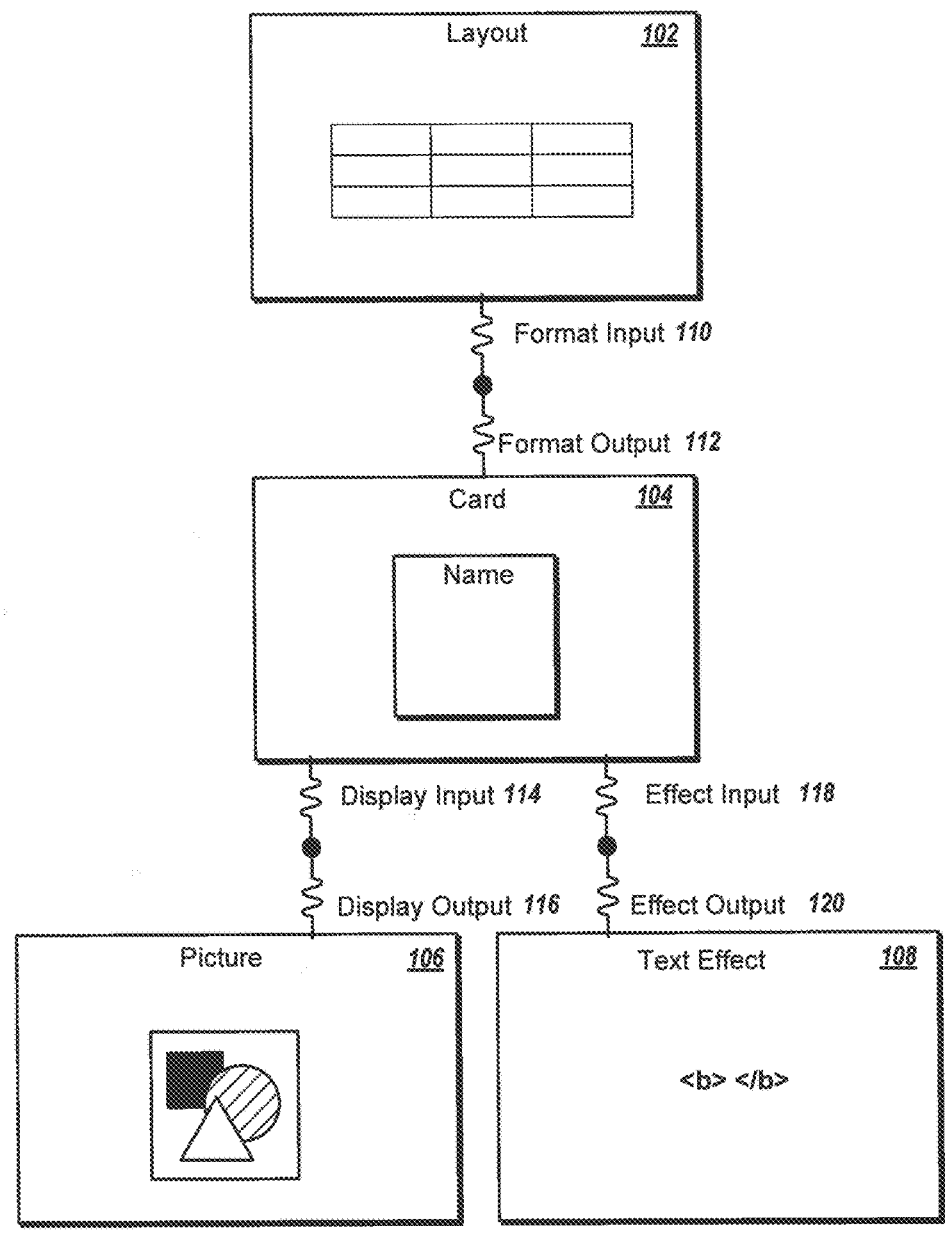
FIG. 1 is a schematic diagram illustrating connections between components.

FIG. 1 is a schematic diagram illustrating connections between components.

FIG. 1 illustrates four example components: a layout component 102, a card component 104, a picture component 106, and a text component 108. Generally speaking, a component is an element of a computer program that includes instructions, resources, or combinations of instructions and resources, for the retrieval, formatting, and presentation of electronic document data and other data (e.g., images, backgrounds, stock text, and data retrieved from the Internet) for example, in a graphical user interface (GUI). Electronic document data is information and metadata associated with an electronic document, for example, the name of a file associated with the document, the size of a file associated with the document, the modification date of a file associated with the document, the creator of the document, or the location where the document was created. Electronic document data can also be the document itself or a part of the content of the document, for example, text included in the document, fields of the document, or multimedia content, such as images and videos, that are embedded in, or referenced by, the document. An electronic document (which for brevity will simply be referred to as a document) may, but need not, correspond to a file. A document may be stored in a portion of a file that holds other documents, in a single file dedicated to the document in question, or in multiple coordinated files.

For example, the layout component 102 specifies an overall layout describing how the relevant document data for each document being presented should be presented relative to the document data for the other documents being presented. The layout component 102 defines a grid layout. The card component 104 presents document data for one or more documents being presented on a square card that specifies the name of the document. The picture component 106 presents an image preview of a document. The text effect component 108 presents text in a bold format. Other components are also possible, for example, a map layout that overlays document data for each document being presented on a map corresponding to the location where the respective document was created, a revolving layout that displays document data for one document at a time and provides a mechanism for rotating between documents, a component that presents document data on a round card, a component that presents a stock image, a component that presents specific information about a document, for example, the creator of a document or the location where a document was created, or a component that presents document content such as multimedia content.

In some implementations, components can also include instructions and resources for modifying document data, for example, by modifying document metadata or document content. For example, a component including instructions for presenting a representation of document data on a map corresponding to where the document was created can also include instructions for modifying the document metadata corresponding to where the document was created in response to user input moving the representation of document data.

The components 102, 104, 106, and 108 can be connected through their inputs and outputs. Each component can have one or more inputs and one or more outputs.

Two components are connected when an output of one component is connected to an input of another component. Connected components can exchange resources and instructions (e.g., document data, web data, instructions for data layout, data retrieval, and other directives, or a component itself), for example, through method or function calls. Resources and instructions can be exchanged directly between connected components, or through an intermediary, for example, an application in which the components are executed.

For example, the layout component 102 has a format input 110 that is connected to the format output 112 of the card component 104. The layout component 102 receives resources and instructions through this connection to present document data according to the layout of the card component. The card component 104 has a display input 114 connected to the display output 116 of the picture component 106. The card component receives resources and instructions from the picture component 106 through the connection. These resources and instructions are for the presentation of a preview of each document on each card. Similarly, the card component 104 has an effect input 118 connected to the effect output 120 of the card component 104. Therefore, the card component receives resources and instructions from the text effect component 108 to present text on each card in bold.

The connections result in a hierarchy of components, where each component depends on the components below it in the hierarchy. For example, the layout component 102 is a parent component. It depends on the card component 104, which is its child component. The card component 104, in turn, depends on the picture component 106 and the text effect component 108. These components are child components of the card component 104 and grandchild components of the layout component 102.

Information about the connections between components can be stored, for example, in the components themselves, or in a separate location, for example, a database of connections.

In some implementations, an input of one component is connected to an output of another component only when the input and the output have the same type. A type is a description of the data that an output exports or an input imports. Types can be represented in various ways. For example, types can be basic types such as integers, floats, or strings, or can be more complex types such as interfaces, structs, or classes. Types can also be represented as strings of text describing the input or output, or as name value pairs. Other types are possible.

In some implementations, the type of the input must exactly match the type of the output. In some implementations, the types are considered the same when they are related to each other, for example, when one type depends from another in an object hierarchy, or when one string of text is a substring of the other string of text.

Figure 2:
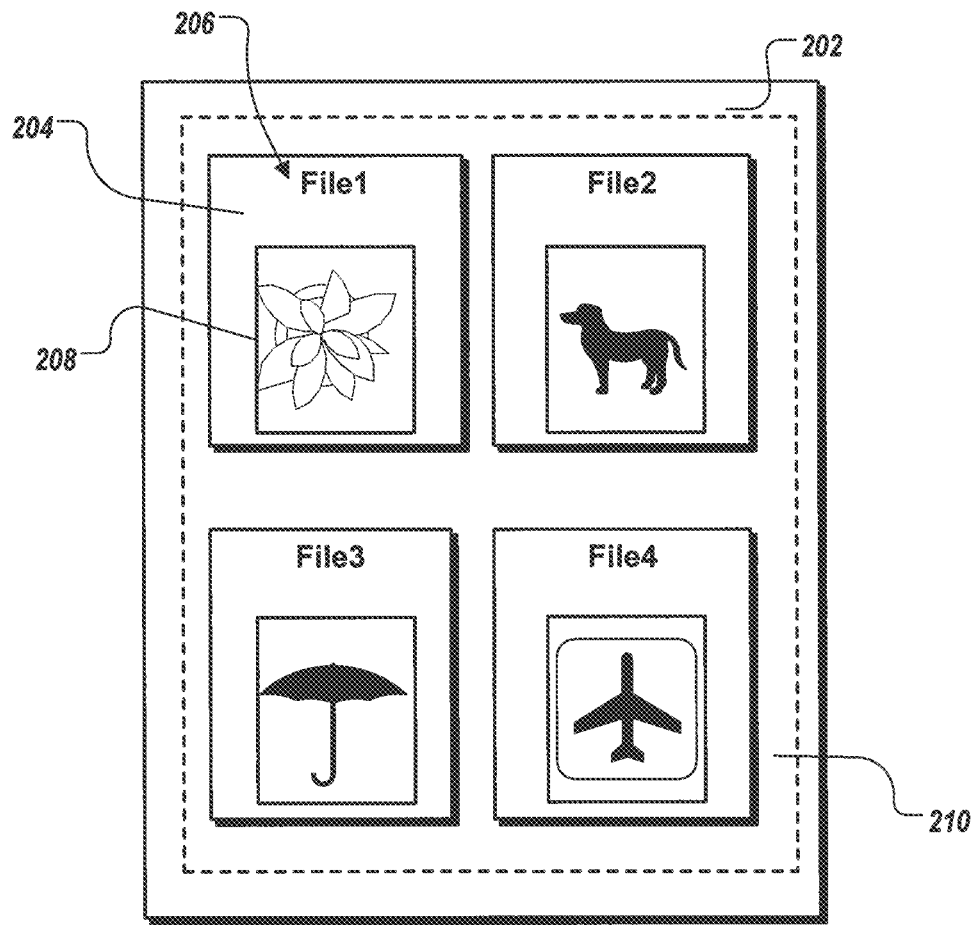
FIG. 2 illustrates a navigation interface generated using the components described in reference to FIG. 1.

FIG. 2 illustrates an example navigation user interface generated using the components described above in reference to FIG. 1. Document data for four documents (File1, File2, File3, and File4) is presented in an application window 202 according to the components described in FIG. 1. The document data for each document is presented on a square card (e.g., 204) that includes the name of the document, as specified by component 104. The name of each document (e.g., 206) is in bold, as specified by component 108. Each card (e.g., 204) includes a preview (e.g., 208) of the document, as specified by component 106. The cards are arranged in a grid layout 210, as specified by component 102. The user can use the navigation interface to navigate among the documents, for example, by examining the document data and selecting one or more documents to open (e.g., using a mouse or other input device).

While FIG. 2 illustrates a visual presentation of document data, presentation of document data is not limited to visual presentation, and can include for example, displaying output on a display device, transmitting sounds, or providing tactile feedback.

Components can also be used to present document data in interfaces other than navigation interfaces, for example, interfaces that present document data. For example, components can be used to build configurable forms in documents, where document data can be presented according to interchangeable components, or to control how multimedia content is presented to a user. Other uses of components are also possible.

Figure 3A:
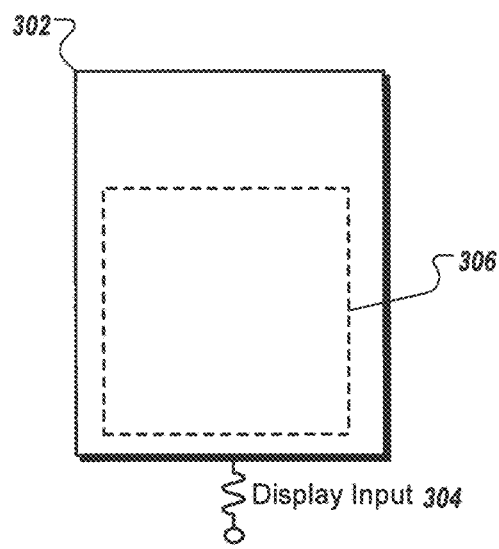
FIGS. 3A to 3C illustrate an example of a connection between an input of one component and an output of another component.
Figure 3B:
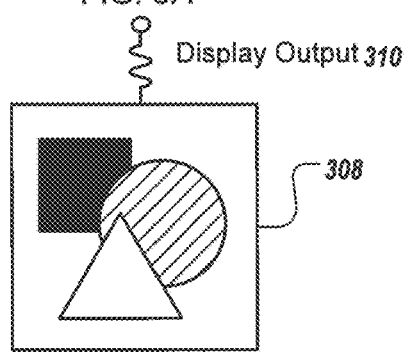
Figure 3C:
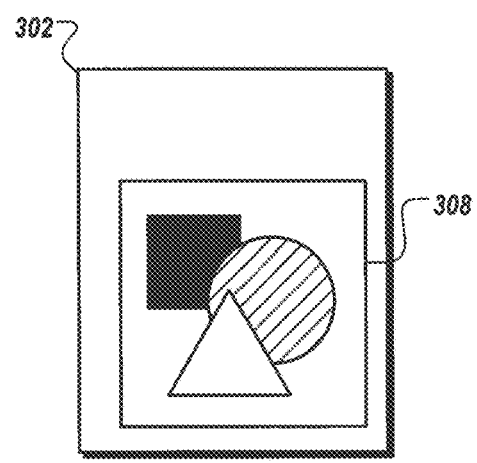

FIGS. 3A to 3C illustrate an example of a connection between an input of one component and an output of another component. FIG. 3A illustrates a visual representation of an example component 302 that displays document data on a rectangular card. A visual representation of a component can include a presentation of document data (and other data) according to the instructions or resources of the component. The example component has an unconnected display input 304. If the display input 304 is connected to a display output of another component, then the content for display can be presented in the dashed box 306.

FIG. 3B illustrates a visual representation of another example component 308 that includes instructions to display a preview image of the document. The example component has an unconnected display output 310. If the display output 310 is connected to the display input of another component, then the preview image would be included at a location specified by the other component.

FIG. 3C illustrates a visual representation of the components 302 and 308, once the input 304 of the component 302 is connected to the output 310 of the component 308. The preview of the component 308 is displayed along with the additional formatting information specified by the component 302.

Figure 4A:
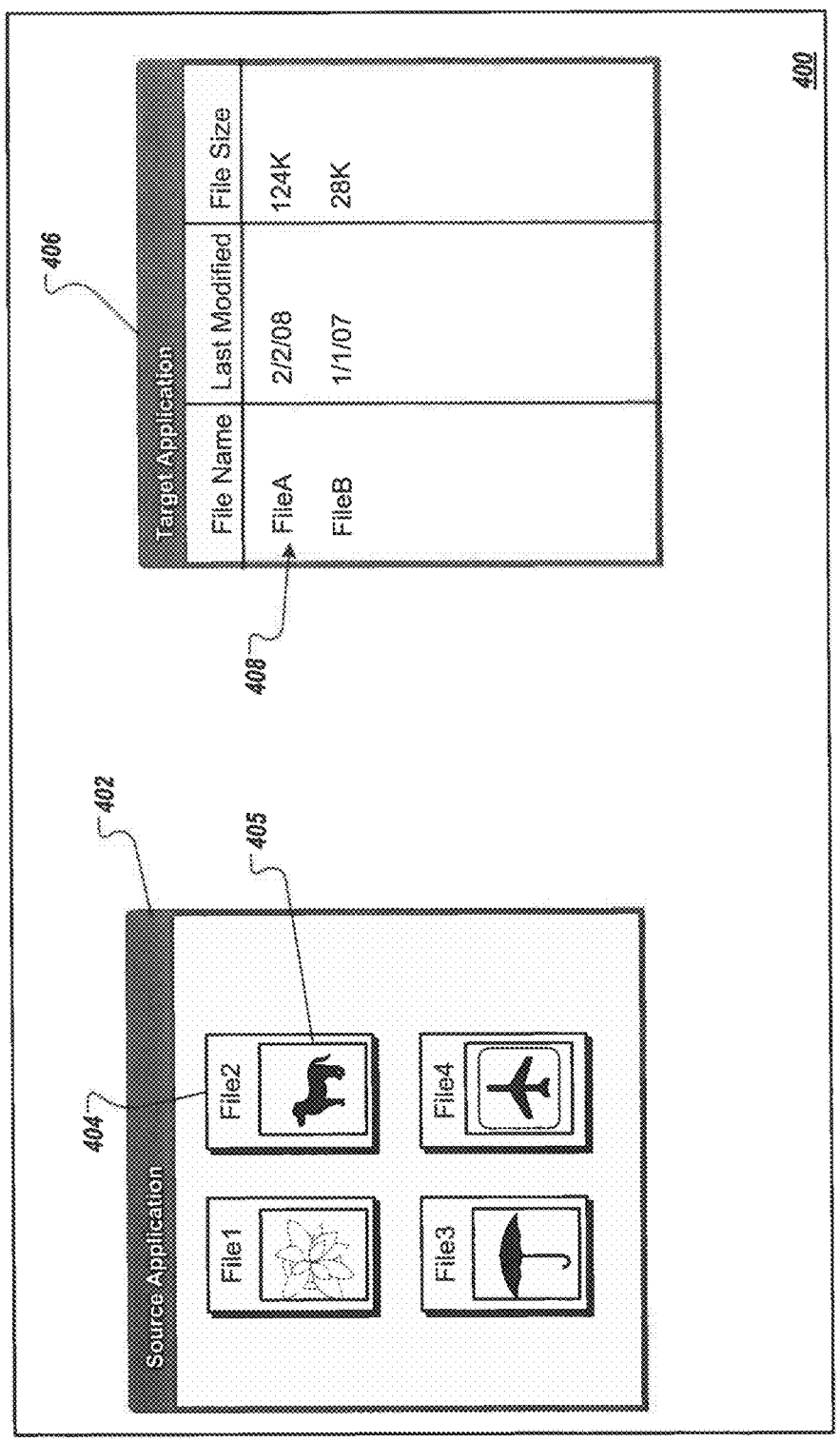
FIG. 4A illustrates example executing applications presented by an operating system or an application environment.

FIG. 4A illustrates example executing applications presented by an operating system or an application environment such as the Adobe Integrated Runtime™ environment available from Adobe Systems Incorporated of San Jose, Calif.

The applications present document data (and data relevant to the document data) using one or more components included in the applications.

Each component can include one or more of programming language source code, compiled or translated programming language source code, metadata, properties, and resources (e.g., images, sounds, files, and other content). By way of illustration, a component can be a method, a function, a procedure, a script, an event handler, a signal handler, or various combinations of these. Other component types are possible. A component can be included in an application in various ways, depending on the type of application. For example, if the application includes a virtual machine (VM), such as the Adobe Flash™ Actionscript virtual machine available from Adobe Systems Incorporated of San Jose, Calif., program instructions or other data corresponding to the component can be loaded into the VM such that the component becomes part of the runtime environment of the application. If the application does not include a VM, then the application can access the program instructions or other data for the component through, for example, a dynamic link library (DLL) or similar mechanism. Other techniques for including a component in an application are possible.

A source and target application are presented as application windows 402 and 406 in a GUI environment such as a desktop 400. The desktop 400 can be configured to allow a user to run one or more applications. The desktop 400 can also permit a user to interact with an application through one or more inputs and controls, including graphical controls. For example, a user can control a cursor displayed in the desktop 400 through an input device such as a mouse or trackball, and enter commands to perform one or more operations.

The source application window 402 presents an interface for navigation among documents based on the components associated with the source application. The components are used during navigation among documents, for example, when document data is presented according to the component's instructions and resources. The source application includes three components: a grid layout component that specifies that document data for documents should be presented in a grid format, a card component that specifies that document data for each document should be presented on a rectangular card including the name of the document, and an image component that specifies that a preview of the document should be presented. An output of the image component is connected to a input of the card component, and an output of the card component is connected to an input of the grid layout component. The source application window 402 presents visual representations of the components in a GUI, for example, a visual representation of the card component 404 and a visual representation of the image component 405. A user can navigate among the documents in the navigation interface, for example, by examining each of the cards in turn and selecting (e.g., with a mouse or other input device) a document by selecting its associated card.

The target application window 406 also presents an interface for navigation among documents based on one or more components associated with the target application. The presentation of document data in the target application window 406 is different from the presentation of document data in the source application window 402, because different components are included in the source and target applications. The target application includes a row layout component, which presents relevant document data in a vertical column, and a list component which lists relevant document data as a table entry. The target window 406 includes visual representations of the components, for example, a visual representation of the data component 408. A user can navigate among the documents in the navigation interface, for example, by scrolling through the table and selecting a document by selecting its row in the table.

Figure 4B:
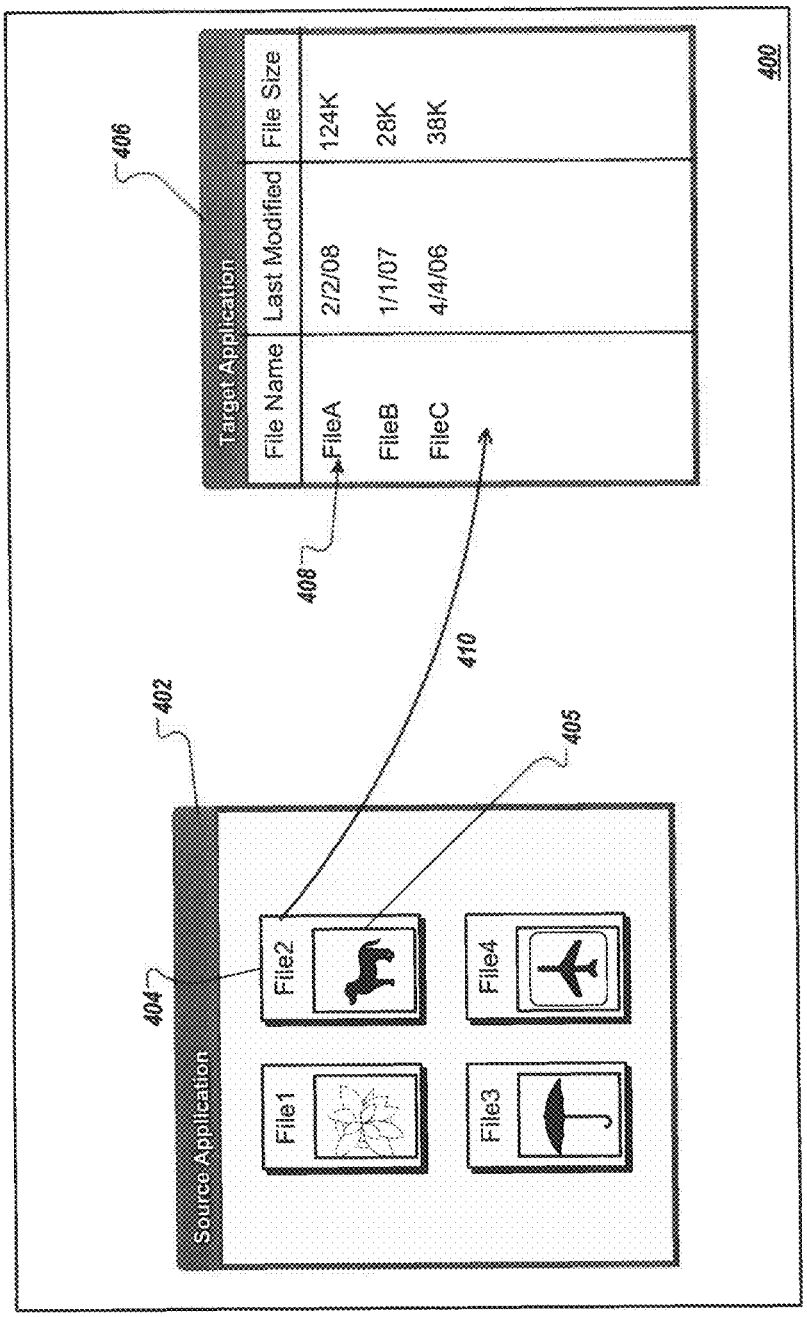
FIGS. 4B and 4C illustrate an example of how a visual representation of a component can be dragged from a source application window and dropped into a target application window.
Figure 4C:
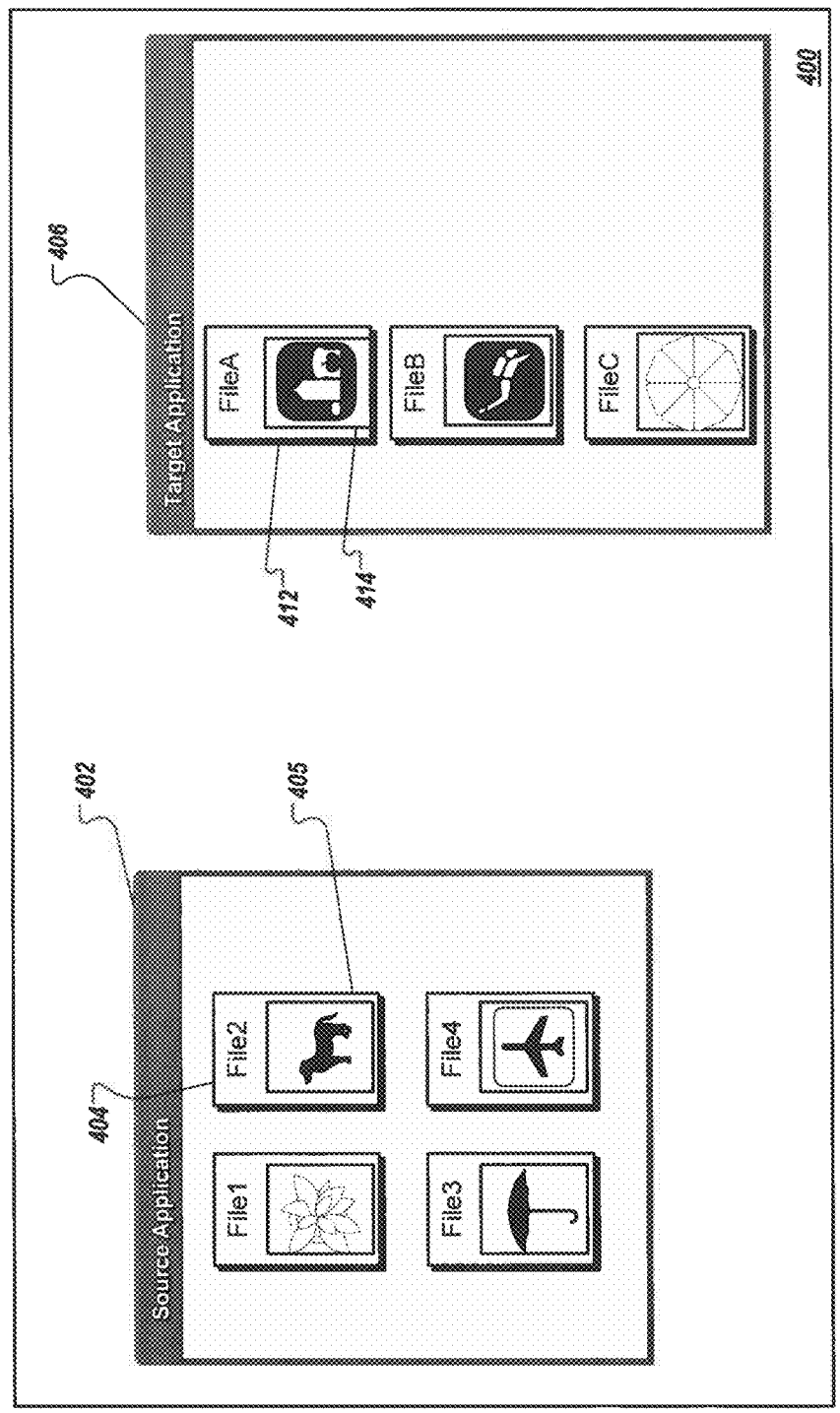

While the source and target application windows shown in FIGS. 4A-4C display navigation interfaces, components can be used to present other types of interfaces, for example, as described above in reference to FIG. 2.

A user may prefer the layout in the source application window 402 over the layout in the target application window 406, and want to include the layout, or a portion of the layout, in the target application window 406. For example, a user may prefer the card component with the document preview as shown in the source application to the list component included in the target application. The user can move the card component with the document preview to the target application by selecting a visual representation of the card component in source application window 402 and dragging it to the target application window 406. The card component and the document preview component will then be inserted into the target application.

FIGS. 4B and 4C illustrate an example of how a visual representation of a component can be dragged from the source application window 402 and dropped into the target application window 406, to insert the component, or a copy of the component, into the target application, using a drag-and-drop operation. Other techniques for interactively performing the same functionality are also possible.

As shown in FIG. 4B, a user can select (e.g., with a mouse or other input device) the visual representation of the card component 404 in the source application window 402 and drag the representation to the target application window 406, as illustrated by the arrow 410. When the user drops the visual representation into the target window 406, the card component, as well as the image component whose output is connected to an input of the card component, are integrated into the target application, as shown in FIG. 4C. Document data in the target window 406 is still presented in a row layout, but rather than listing document data by itself, the document data is presented according to the card and image components (as shown, for example, by the visual representation 412 of the card component and the visual representation 414 of the image component).

The example of component integration described above will now be discussed in more detail. Initially, the parent component to be moved or copied is identified from user input. For example, the source application associated with the source application window 402, or another process, can detect that a mouse drag event has occurred on a window region associated with the card component. The window region can be associated with the component, for example, because the region includes document data presented according to the component. In some implementations, the window region can be associated with the component because the region includes document data presented according to the child of the component.

In response to the mouse drag event, the source application, or another process, determines that the image component has an output connected to an input of the card component. The source application, or another process, may also collect component information for the card and image components that might be needed by the target application.

The target application, or another process, then detects that a mouse drop event has occurred in the target window 406 (or an alternative representation of the target application such as an icon or other visual object.) In response, the target application, or another process, inserts the code for the card and image components into the target application (e.g., by loading the code associated with the components into a VM or by dynamically loading the components' code through a mechanism such as a DLL). The target application, or another process, can then connect the input of the card component to the output of the image component. Inserting code for both the selected component and its child component is advantageous, for example, because a user often wants the entire presentation of content to be copied from one application to another, and may not be aware of the multiple components associated with a parent component and used to present document data. The target application, or another process, may also receive component information for the card and image components and include the component information in the target application.

The target application window 406 is updated to present document data according to the card and image components, rather than the previous row layout format.

Figure 5:
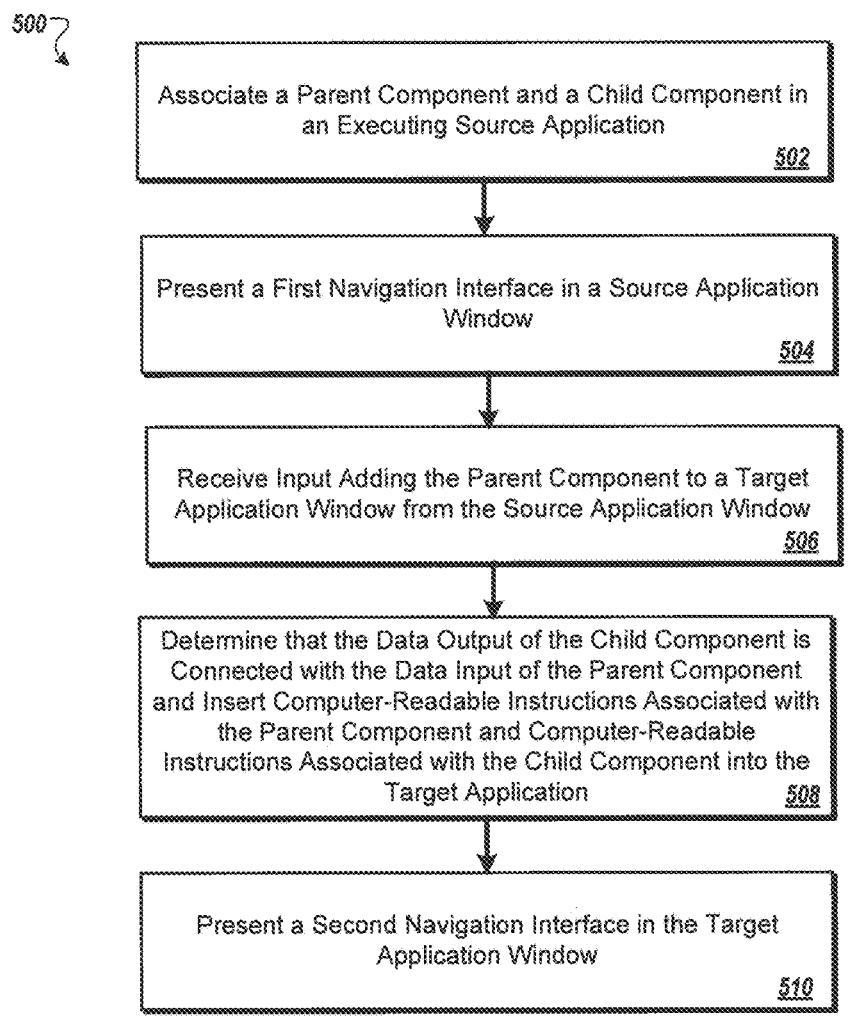
FIG. 5 illustrates an example method for adding a component from a source application window into a target application window.

FIG. 5 illustrates an example method 500 for adding a component from a source application window into a target application window. The method can be performed, for example, by one or more computers.

A parent component and a child component are associated in an executing source application (step 502). The two components can be associated when an output of the child component is connected to an input of the parent component. The connection is described above in more detail in reference to FIG. 1. The parent and child components are used in the presentation of document data during navigation among documents.

In some implementations, the association is stored, for example, in a table associating inputs and outputs that is accessible to the executing source application.

A first navigation interface is presented in a source application window (step 504). The source application window is associated with the source application. The first navigation interface allows for navigation among one or more source documents. Source documents can include documents that are presented by the source application or documents that are accessible from the source application. The navigation interface can present source document data associated with one or more of the source documents according to the parent and child components, for example, as illustrated above in FIG. 4A. In general, document data (and other data) is presented according to a component when it is presented according to the instructions and/or resources of the component. In some implementations, an interface other than a navigation interface can be presented, for example, as described above in reference to FIG. 2.

Once the first navigation interface is presented, a user can navigate among the source documents using the first navigation interface. For example, a user can view document data for the documents and select one or more documents for presentation using an input device such as a mouse or keyboard.

Input is received that adds the parent component to a target application window from the source application window (step 506). The target application window is associated with a target application. The input can be a drag-and-drop operation, for example, as described above in reference to FIGS. 4B and 4C. Other inputs are possible, for example, a drag-and-drop operation selecting a representation of the parent component from a list of components in the source application window and dragging the representation to the target application window. The representation can take several forms including, for example, text or images. Other possible inputs include one or more commands received through a command line interface, or copy-and-paste commands that indicate that the parent component should be copied from the source application window and pasted into the target application window. Inputs can be received, for example, from a process or from a user.

It is determined that the output of the child component is connected with the input of the parent component, and then computer-readable instructions associated with the parent component and computer-readable instructions associated with the child component are inserted into the target application (step 508).

The determination that an output of the child component is connected with an input of the parent component can be made, for example, by retrieving the association between the parent and child component from a table accessible to the source application. Other methods for making the determination are possible. For example, component information specifying connections for the parent component can be maintained, and the component information can be examined to identify connected inputs of the parent component. In some implementations, a graph of the method and function calls made by components can be generated and used to identify connected inputs of the parent component, for example, by traversing the edges of the graph. In some implementations, the parent component stores information on its data connections, and the determination can be made by examining the parent component's stored data.

The computer-readable instructions associated with the parent component and the computer-readable instructions associated with the child component are inserted into the target application, for example, as described above in reference to FIG. 4B-4C.

Other information associated with one or both of the parent component and the child component can also be inserted into the target application. For example, the location of resources used by one or both of the components can be inserted.

Other types of component information can also be inserted into the target application. For example, in some implementations, components are associated with restriction information, for example, Digital Rights Management (DRM) information and security information. DRM information can include the privileges and rights associated with a component. For example, DRM information can include whether the component can be used only for demonstration purposes or for all purposes, a limit on the number of days or the number of times that a component can be used, and whether a component can be transferred to other applications. Security information can specify what resources a component can access, for example, whether the component can access local resources on a user's computer, whether the component can access resources available over a local network, and whether the component can access resources available through the Internet. In these implementations, the restriction information associated with one or both of the components can also be inserted into the target application.

In some implementations, before computer-instructions associated with the parent component or the child component are inserted into the target application, a verification is done to ensure that the components can be inserted into the target application.

For example, the target application can have restrictions such as DRM requirements or security requirements. DRM requirements can specify the privileges and rights associated with the application, for example, whether the application is for demonstration purposes only or for all purposes, or a limit on the number of days or the number of times that an application can be used. Security requirements can specify what resources an application can access. Verification can include, for example, examining any DRM information associated with the parent and child components and confirming that the DRM information does not prohibit transferring the component to another application. The verification can also include, for example, confirming that any DRM information of the parent and child components satisfies the DRM requirements of the target application. The verification can also include, for example, confirming that any security information for the parent and child component satisfy the security requirements of the target application. In some implementations, if one of the parent component or the child component can be inserted into the target application but the other component cannot be, only the component that can be inserted is actually inserted into the target application. In some implementations, if one of the parent component or the child component can be inserted into the target application but the other component cannot be, then neither component is inserted and the method stops.

In some implementations, if the component information for the parent and/or child component does not satisfy the DRM requirements or security requirements of the target application, the DRM information or the security information of the components can be modified to satisfy the requirements of the target application. For example, if the parent component can access resources from a local network, but the target application does not allow the access of resources from the local network, the parent component's security information can be modified to indicate that it cannot access resources from the local network.

A second navigation interface is presented in the target application window (step 510). The second navigation interface can allow for navigation between one or more target documents (e.g., documents that are presented by the target application or documents that are accessible from the target application). The second navigation interface can present target document data associated with the target documents according to the parent and child components, for example, as illustrated above in FIG. 4C.

In some implementations, it is determined that an input of the child component is not connected to an output of a component in the target application. In some implementations, a user is then prompted to identify a component in the target application that has an output that should be associated with the input of the child component. Input can be received from the user that identifies a component, and the input of the child component can be connected to the output of the identified component.

Alternatively, one or more candidate components (e.g., components in the target application with an unconnected output of the same type as the child component's unconnected input) can be identified. Candidate components can be identified, for example, by examining component information for one or more components and identifying outputs that are unconnected and have a same type as the child component's unconnected input. In some implementations, the target application, or another process, maintains a table of inputs and outputs for each component, the type of the inputs and outputs, and what the inputs and outputs are connected to. In these implementations, candidate components can be identified by examining the table and identifying unconnected outputs of the same type as the child component's unconnected input.

Once one or more candidate components are identified, a user can be prompted to identify a component from the candidate components or to confirm that an output of a candidate component should be connected to the input of the child component.

Alternatively, a candidate component can be automatically selected and a connection can be made between the output of the candidate component and the input of the child component, without seeking user input. The candidate component can be selected according to a variety of metrics, for example, by selecting the candidate component with the fewest unconnected outputs or the most unconnected inputs. Other metrics for selecting the candidate component can be used, for example, selecting the first candidate component that is identified, or selecting the candidate component having the most unconnected data outputs having the same type as unconnected data inputs of the child component.

In some implementations, it is determined that an output of the parent component is not connected to an input of a component in the target application. In further implementations, the output of the unconnected parent component is connected to an input of a component in the target application much as described above in reference to connecting the input of the child component.

In some implementations, the child component is further associated with a grandchild component and an output of the grandchild component is connected with an input of the child component. In these implementations, the parent and child and grandchild components are also used in the presentation of document data during navigation between documents. Determining that the output of the child component is connected with the input of the parent component can also include determining that the output of the grandchild component is connected with the input of the child component. Computer-readable instructions associated with the grandchild component can also be inserted into the target application. When the second navigation interface is presented, target document data can be presented according to the parent and child and grandchild components.

Figure 6:
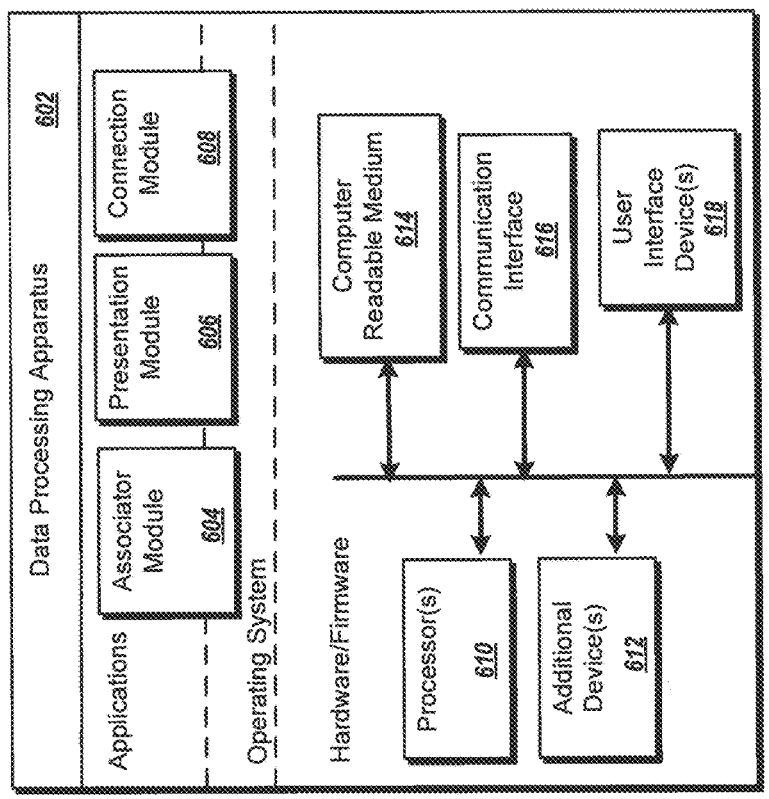
FIG. 6 illustrates an example architecture of a data processing apparatus.

FIG. 6 illustrates an example architecture of a data processing apparatus 602, used, for example, to perform the method described above in reference to FIG. 5. While only one data processing apparatus is shown in FIG. 6, a plurality of data processing apparatus may be used.

The data processing apparatus 602 includes various modules, e.g., processes or executable software programs. These modules include an associator module 604, a presentation module 606, and a connection module 608.

The associator module 604 associates a parent component and a child component in an executing source application, for example, as described above in reference to FIG. 5.

The presentation module 606 presents navigation interfaces, and other interfaces. For example, the presentation module 606 can present one or both of a navigation interface in a source application window and a navigation interface in a target application window, as described above in reference to FIG. 5.

The connection module 608 determines that an output of a child component is connected with an input of a parent component, for example, as described above in reference to FIG. 5. The connection module 608 optionally maintains a table of connections between components to aid in this determination. Once the connection module 608 makes the determination that an output of the child component is connected to the input of the parent component, the connection module 608 can also insert computer-readable instructions associated with the parent component and the child component into the target application. In some implementations, the connection module 608 further determines that the output of the parent component (or an input of a child component) is not connected to a component in the target application, and identifies a candidate component with which to associate the parent (or child) component, for example, as described above in reference to FIG. 5.

In some implementations, the data processing apparatus 602 stores one or more of computer-readable instructions, component information, associations between components, connections between components, documents, and document data. In some implementations, this data is stored on a computer readable medium 614. In some implementations, this data is stored on one or more additional devices 612, for example, a hard drive.

The data processing apparatus 602 also has hardware or firmware devices including one or more processors 610, one or more additional devices 612, computer readable medium 614, a communication interface 616, and one or more user interface devices 618. For example, input adding a parent component to a target application window from a source application window can be received through the communication interface 616 or from one of the user interface devices 618.

FIG. 7 is a schematic diagram of an example of a generic computer system 700. The system 700 can be used for the operations described in association with the method 500, according to one implementation.

The system 700 includes a processor 710, a memory 720, a storage device 730, and an input/output device 740. Each of the components 710, 720, 730, and 740 are interconnected using a system bus 750. Instructions that implement operations associated with the methods described above can be stored in the memory 720 or on the storage device 730. The processor 710 is capable of processing instructions for execution within the system 700. In one implementation, the processor 710 is a single threaded processor. In another implementation, the processor 710 is a multithreaded processor. The processor 710 is capable of processing instructions stored in the memory 720 or on the storage device 730 to display graphical information for a user interface on the input/output device 740.

The memory 720 stores information within the system 700, including program instructions. In one implementation, the memory 720 is a computer readable medium. In one implementation, the memory 720 is a volatile memory unit. In another implementation, the memory 720 is a nonvolatile memory unit.

The storage device 730 is capable of providing mass storage for the system 700. In one implementation, the storage device 730 is a computer readable medium. In various different implementations, the storage device 730 may be a floppy disk device, a hard disk device, an optical disk device, or a tape device. The storage device can store extractors, pattern matching engines, gadgets, machines, and programs.

The input/output device 740 provides input/output operations for the system 700. In one implementation, the input/output device 740 includes a keyboard and/or pointing device. In another implementation, the input/output device 740 includes a display unit for displaying graphical user interfaces.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
    associating a parent component and a child component in an executing source application, wherein an output of the child component is connected with an input of the parent component, and wherein the parent and child components are configured to present document data in a source application user interface;
    causing display of document data representing a source document in the source application user interface, wherein the document data representing the source document is generated by at least the parent component and has a first visual characteristic;
    causing display of document data representing a target document in a target application user interface of an executing target application, wherein the document data representing the target document is not generated by the parent component and has a second visual characteristic that is different from the first visual characteristic;
    receiving input applying the document data representing the source document to the target application user interface, wherein the received input comprises a drag-and-drop operation;
    in response to receiving the received input, inserting computer readable instructions associated with the parent component and computer readable instructions associated with the child component into the target application, wherein the input of the parent component is connected with the output of the child component in the target application;
    further in response to receiving the received input, using the computer readable instructions inserted into the target application to generate modified document data that represents the target document, wherein the modified document data representing the target document has the first visual characteristic; and
    further in response to receiving the received input, removing the document data representing the target document from the target application user interface and causing display of the modified document data representing the target document in the target application user interface.

2. The method of claim 1, wherein:
    associating the parent and child components further comprises associating a grandchild component with the child component in the executing source application;
    an output of the grandchild component is connected with an input of the child component;
    the parent, child, and grandchild components are used during navigation amongst a plurality of documents that are represented by the document data presented in the source application user interface; and
    the source document is one of the plurality of documents.

3. The method of claim 1, wherein:
    associating the parent and child components further comprises associating a grandchild component with the child component in the executing source application;
    an output of the grandchild component is connected with an input of the child component;
    the parent, child, and grandchild components are used during navigation amongst a plurality of documents that are represented by the document data presented in the source application user interface;
    the source document is one of the plurality of documents; and
    the method further comprises inserting computer readable instructions associated with the grandchild component into the target application.

4. The method of claim 1, wherein:
    associating the parent and child components further comprises associating a grandchild component with the child component in the executing source application;
    an output of the grandchild component is connected with an input of the child component;
    the parent, child, and grandchild components are used during navigation amongst a plurality of documents that are represented by the document data presented in the source application user interface;
    the source document is one of the plurality of documents; and
    the modified document data that represents the target document is generated by the parent, child, and grandchild components.

5. The method of claim 1, further comprising:
    determining that an input of the child component is not connected to an output of any component in the target application;
    identifying a first component in the target application that (a) has an output of a same type as the input of the child component and (b) is not connected to an input of any component in the target application;
    associating the child component and the first component in the target application; and
    connecting the input of the child component with the output of the first component.

6. The method of claim 1, further comprising:
    determining that an output of the parent component is not connected to an input of any component in the target application;
    identifying a second component in the target application that (a) has an input of a same type as the output of the parent component and (b) is not connected to an output of any component in the target application;
    associating the parent component and the second component in the target application; and
    connecting the output of the parent component with the input of the second component.

7. The method of claim 1, further comprising causing a virtual machine associated with the target application to execute the computer readable instructions associated with the parent and child components.

8. A system comprising:
an associator module configured to associate a parent component and a child component in an executing source application, wherein a relationship between the parent and child components exists such that an output of the child component is connected with an input of the parent component, and wherein the parent and child components are configured to present document data in a source application user interface;
a presentation module configured to
cause display of document data representing a source document in the source application user interface, wherein the document data representing the source document is generated by the parent component, and has a first visual characteristic, and
cause display of document data representing a target document in a target application user interface of an executing target application, wherein the document data representing the target document is not generated by the parent component, and has a second visual characteristic that is different from the first visual characteristic; and
a connection module configured to insert, in response to receiving a drag-and-drop command input applying the document data representing the source document to the target application user interface, computer readable instructions associated with the parent component and computer readable instructions associated with the child component into the target application,
wherein the input of the parent component is connected with the output of the child component in the target application,
wherein the computer readable instructions inserted into the target application, when executed by one or more processors, generate modified document data that represents the target document, and
wherein the modified document data representing the target document has the first visual characteristic;
wherein the presentation module is further configured to, in response to receiving the command input, remove the document data representing the target document from the target application user interface and cause display of the modified document data representing the target document in the target application user interface.

9. The system of claim 8, wherein the associator module is further configured to store an association between the parent and child components in a table that is accessible to the source application.

10. The system of claim 8, wherein the connection module is further configured to examine digital rights management information associated with the parent component, the child component, or both the parent and child components before inserting computer readable instructions into the target application.

11. The system of claim 8, wherein the connection module is further configured to:
conduct an examination of digital rights management information associated with the parent component, the child component, or both the parent and child components; and
modify security information associated with the parent component, the child component, or both the parent and child components based on the examination.

12. The system of claim 8, wherein the connection module is further configured to:

determine that an input of the child component is not connected to an output of any component in the target application; and
generate a list of components in the target application that (a) have an output of a same type as the input of the child component and (b) are not connected to an input of any component in the target application.

13. The system of claim 8, wherein the connection module is further configured to:
determine that an output of the parent component is not connected to an input of any component in the target application; and
generate a list of components in the target application that (a) have an input of a same type as the output of the parent component and (b) are not connected to an output of any component in the target application.

14. A computer program product encoded on a non-transitory computer storage medium, the computer program product operable to cause a data processing apparatus to perform operations comprising:
associating a parent component and a child component in an executing source application, wherein an output of the child component is connected with an input of the parent component, and wherein the parent and child components are configured to present document data in a source application user interface;
causing display of document data representing a source document in the source application user interface, wherein the document data representing the source document is generated by the parent component and has a first visual characteristic;
causing display of document data representing a target document in a target application user interface of an executing target application, wherein the document data representing the target document is not generated by the parent component, and has a second visual characteristic that is different from the first visual characteristic;
receiving input applying the document data representing the source document to the target application user interface, wherein the received input comprises a drag-and-drop operation;
in response to receiving the received input, inserting computer readable instructions associated with the parent component and computer readable instructions associated with the child component into the target application, wherein the input of the parent component is connected with the output of the child component in the target application;
further in response to receiving the received input, using the computer readable instructions inserted into the target application to generate modified document data representing the target document, wherein the modified document data representing the target document has the first visual characteristic; and
further in response to receiving the received input, removing the document data representing from the target application user interface the target document in the target application user interface and causing display of the modified document representing the target document in the target application user interface.

15. The computer program product of claim 14, wherein the operations further comprise:
determining that an input of the child component is not connected to an output of any component in the target application;

identifying a first component in the target application that (a) has an output of a same type as the input of the child component and (b) is not connected to an input of any component in the target application;
associating the child component and the first component in the target application; and
connecting the input of the child component with the output of the first component.

16. The computer program product of claim 14, wherein:
associating the parent and child components further comprises associating a grandchild component with the child component in the executing source application;
an output of the grandchild component is connected with an input of the child component;
the parent, child, and grandchild components are used during navigation amongst a plurality of documents that are represented by the document data presented in the source application user interface; and
the source document is one of the plurality of documents.

17. The computer program product of claim 14, wherein the operations further comprise:
determining that an output of the parent component is not connected to an input of any component in the target application;
identifying a second component in the target application that (a) has an input of a same type as the output of the parent component and (b) is not connected to an output of any component in the target application;
associating the parent component and the second component in the target application; and
connecting the output of the parent component with the input of the second component.

18. The computer program product of claim 14, wherein the operations further comprise causing a virtual machine associated with the target application to execute the computer readable instructions associated with the parent and child components.

* * * * *